United States Patent Office 3,115,330
Patented Dec. 24, 1963

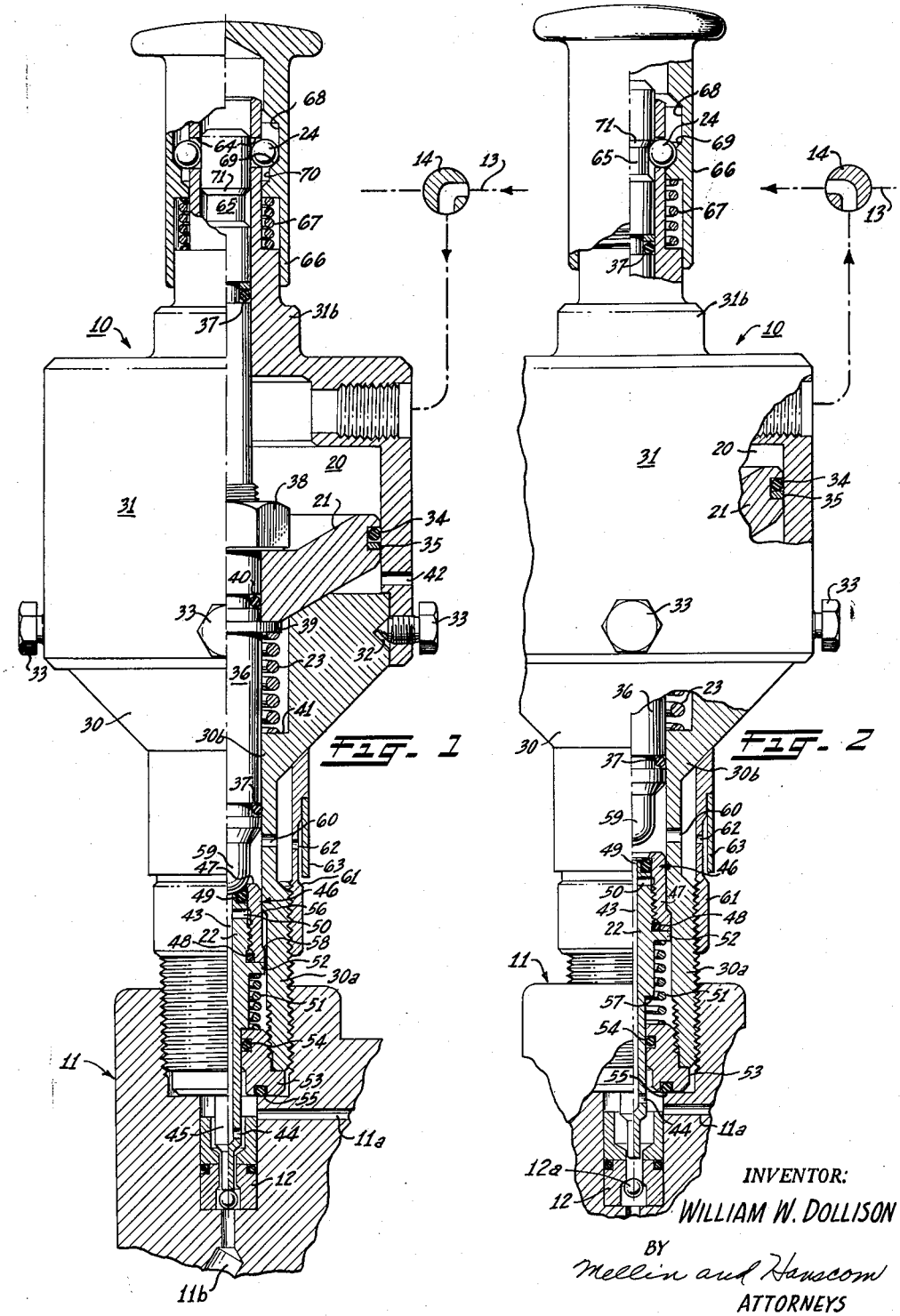

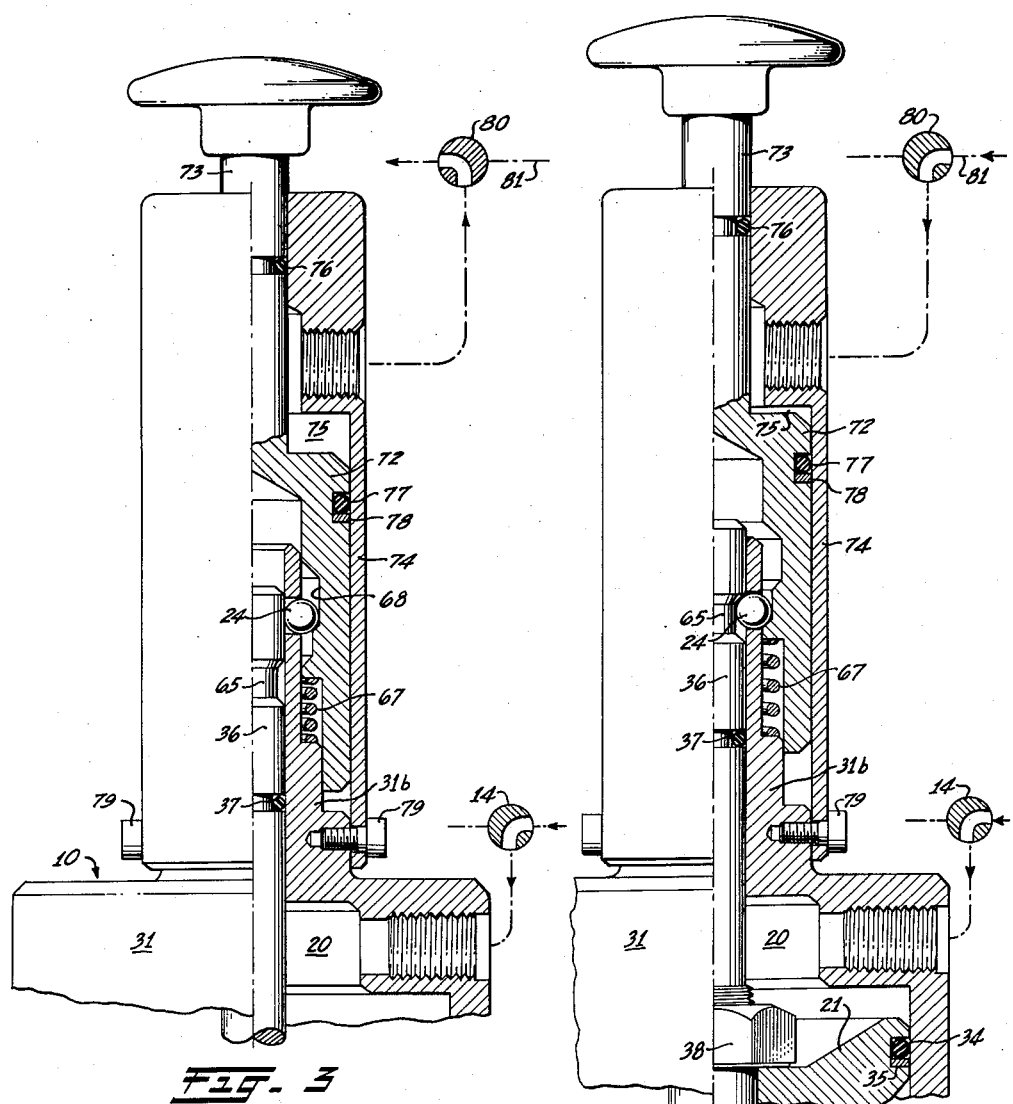

3,115,330
PRESSURE CONTROLLED PILOT VALVE
OPERATING DEVICE
William W. Dollison, Dallas, Tex., assignor to Otis Engineering Corporation, Dallas, Tex., a corporation of Delaware
Filed May 23, 1960, Ser. No. 31,091
7 Claims. (Cl. 251—62)

This invention relates to apparatus for operating pilot valves. More specifically, the invention involves a pressure controlled valve device that is adapted for operating a pilot valve member from its valve seat, thereby controlling the fluid pressure of a chamber normally sealed by said pilot valve member.

Safety control valves, such as the one disclosed in United States Patent No. 2,566,772 have been designed which incorporate one or more pilot valves that may open or close a control valve. The pilot valves are conventionally operated and controlled by pressure responsive valve control devices, like the one described in United States Patent No. 2,902,046. Although the conventional control devices are constructed to be affected by the controlled line pressure, the present invention, which is similarly adapted, may be connected to and controlled by any reference source of line pressure (including the controlled line pressure if desired).

This invention, therefore, has a greater field of application than devices now being employed, and it may be advantageously utilized in a fluid pressure system that may be affected by several variables or parameters. As one example of practical application, this invention could be used in an instrument-air system of the oil industry for protecting offshore platforms against the hazards of blowouts, which might result from equipment failure, excessive pressures, storm damage, collision, or other causes.

In one system of application a low pressure gas would be piped to various pressure line control instruments and flow control devices. Pressure within the piping system would maintain the flow control devices in a state of readiness, permitting oil to flow from the wells. But if any one of the instruments should detect a dangerous condition, then the pressure line would be vented and the flow control devices would cause their respective safety control valves to be closed. As will become apparent in view of the following description, this invention will be of particular value in the effective use of such control systems.

In brief, the pilot valve control device hereinafter more particularly described is comprised of an expansible chamber device having a movable wall member that will reciprocate a pilot valve operating member in response to an applied fluid pressure. Should the applied fluid pressure be reduced below a predetermined minimum, then the pilot valve operating member will allow the controlled pilot valve to be closed, said valve operating member being constructed to allow the pressure chamber above the pilot valve to be bled. A catch means is provided for retaining the wall member and valve operating member in a valve closing position, thereby preventing an opening of the pilot valve if the applied pressure should be reestablished; and a manual or controlled operating means is provided for selectively releasing said catch means to allow the pilot valve to be reopened. The valve control device is also constructed so that the valve operating member has but a limited degree of reciprocal movement toward the pilot valve element, thus eliminating the possibility of imposing abnormally high forces upon the valve element (which forces might damage the pilot valve). An additional feature of the disclosed control device is its ability to adjust to various fluid connections, having a body portion that may be swiveled or axially rotated to accommodate different radial connections.

Various objects and advantages in addition to those above indicated will become apparent in view of the following detailed description.

In the drawings forming a part of this application and in which like parts are designated by like reference numerals throughout the same, FIG. 1 is an elevation partly in section of one embodiment of the invention, connected for operating the pilot valve of a safety control valve;

FIG. 2 is a second elevation, partly in section, of a portion of the embodiment illustrated in FIG. 1, but showing the pilot valve operating member in a retracted position.

FIG. 3 is an elevation of the catch releasing structure of a second embodiment of this invention, shown partly in section; and FIG. 4 is another elevational view of the catch releasing structure shown in FIG. 3, but showing the operating parts in their alternate catch engaging position.

Referring more particularly to FIGS. 1 and 2, one embodiment of a novel valve operating device, generally indicated by reference numeral 10, is shown threadedly connected to a safety type control valve 11 having a main flow passage 11b and 11a therethrough and having a conventional pilot valve 12 in said main flow passage. The valve operating device 10 is adapted to be connected to a pressure line 13 including a three-way valve 14, said pressure line and valve being schematically shown for purposes of explanation.

In terms of broad inclusion, valve operating device 10 comprises an expansible chamber 20 having a piston or movable wall member 21, a valve operating member 22, resilient spring means 23 for biasing said piston against the fluid pressure within said chamber, and a catch means including detent ball members 24 for retaining piston 21 in a spring biased position upon a reduction in applied fluid pressure. Device 10 is normally supplied with fluid pressure, as through the pressure line 13 (FIG. 1), thereby causing the piston 21 to be moved against the spring biasing means 23 and causing the valve operating member 22 to engage the ball valve element 12a of pilot valve 12. If the fluid pressure in line 13 should be abnormally reduced or shut off, as by operating the three-way valve 14 to a venting position (FIG. 2), piston 21 will be moved upwardly as shown until the catch means is operated, thereby retaining the piston 21 and valve operating member 22 in positions away from the ball valve element of valve 12. Until the catch means is selectively released the piston is retained in this position even though the pressure line 13 is reconnected to chamber device 20.

Valve operating device 10 is more specifically comprised of a cylindrical housing including a base portion 30 (having a tubular valve operator housing 30a) and an expansible chamber portion 31, said portions 30 and 31 being axially joined in a telescopic fit. A peripheral groove 32 is formed in base portion 30 and a plurality of screw members 33 is inserted through a surface of chamber portion 31 which overlaps said groove, said screw members engaging groove 32 and fastening the portions 30 and 31 together. This construction enables the base and chamber portions to be relatively rotated about their common axis and joined in any number of radially adjusted positions. The base portion 30 may then be axially connected to control valve 11 by threading and yet the chamber portion 31 may be relatively rotated with respect to base 30 in order to accommodate a threaded radial connection with pressure lines approaching from any side direction.

The piston or movable wall member 21 is disposed within chamber portion 31, said piston being provided with an external annular groove which retains an O-ring seal 34 and a back-up ring 35. The O-ring makes contact with the cylindrical inner surface of chamber 31, fluidly sealing said chamber, and back-up ring 35 prevents an extrusion of said O-ring when acted upon by fluid pressures from within said chamber. Piston 21 is reciprocally guided within chamber 31 by a rod member 36 that is axially mounted in reduced area portions 30b and 31b of housing portions 30 and 31, respectively, and O-ring seals 37 prevent fluid pressure leakage from between rod 36 and said reduced area portions. Piston 21, being provided with a central bore for receiving rod member 36 therethrough, is joined thereto by a nut member 38 threaded to the rod. The nut member maintains the piston against the facing of an annular flange 39 while another O-ring 40 prevents leakage from the pressure chamber through the piston's central bore.

The spring biasing means 23 is comprised of a coil spring that is disposed within base portion 30, being seated upon a shoulder 41 and extending into contact with flange 39. Thus, the spring urges the piston 21 into the pressure chamber against the applied fluid pressure, an opening 42 being provided in the housing to prevent pressure build-ups or vacuum forces back of the piston.

Valve operating member 22 is constructed with an exhaust passage to allow fluid to be bled from the portion 11a of the main flow passage of control valve 11 upon closure of its pilot valve 12 which is upstream of the main flow passage portion 11a. To accomplish this result, member 22 is provided with an axial passage 43 extending from a radial port 44 in the projected stem end 45, as shown, said passage 43 terminating in a valve seat assembly 46 mounted at the upper end of member 22. Assembly 46 comprises a cylindrical sleeve 47 threaded about member 22 and including an O-ring 48 for rendering the connection to member 22 fluid-tight. A valve seal ring 49 is lodged in an annular space provided between member 22 and sleeve 47, and a portion of the seal ring is axially exposed to provide a valve seat.

It will be noted that member 22 is provided with a radial opening 50 extending from passage 43 to the underside of seal ring 49. The fluid pressure applied into port 44 from control valve 11 will thereby be applied against the underside of the seal ring, producing an improvement in its sealing ability.

The valve operating member 22 is mounted for limited reciprocal movement in tubular housing portion 30a and is biased upwardly in the direction of piston 21 by a helical spring 51, said spring engaging a collar 52 on the member 22 while being seated upon a retainer plug 53. An O-ring 54 disposed in an annular groove of said plug provides a fluid seal between housing portion 30a and valve operating member 22, and another O-ring 55 is placed in the grooved outer end of plug 53 for sealing the axial connection to control valve 11. Plug 53 and an internal shoulder 56 within tubular housing 30a establish limits of travel for the valve operating member. In view of FIGS. 1 and 2 it will be noted that the inner end of plug 53 will be engaged by the stepped shoulder 57, and a second stepped shoulder 58 will engage shoulder 56 in the reverse direction of movement.

A valve member 59, mounted to the lower end of rod 36, as shown, cooperates with the valve seat provided by seal ring 49 of valve assembly 46. Thus, when sufficient fluid pressure is applied into the pressure chamber to overcome the biasing force of spring means 23, piston 21 is positioned as shown in FIG. 1, placing valve member 59 into engagement with seal ring 49. However, should the pressure in said pressure chamber be abnormally reduced and the piston retracted, valve member 59 will be withdrawn from seal ring 49 after the valve operating member 22 reaches the limit of its reciprocal traverse, as shown in FIG. 2.

With the operating parts assuming the relationship shown in FIG. 2, it will be apparent that valve operating member 22 is biased upwardly by spring 51, thereby withdrawing stem end 45 from engagement with the ball element of pilot valve 12. Also, inasmuch as valve member 59 is unseated from seal ring 49, fluid pressure is transmitted and bled from passage 11a of control valve 11 through port 44, passage 43, valve assembly 46 and a bleed opening 60, provided in the housing. A muffler 61 having a port opening 62 is threadedly attached to said housing and receives the fluid bled through opening 60. Muffler 61 defines an annular space around the housing which helps to muffle the noises and control the rapidity with which the fluid is allowed to escape. A shield 63 is attached to the muffler, as by welding, and serves to deflect escaping fluid while shielding port 62 from debris and the like.

It should be noted that the above described valve relationships are maintained while insuring by design construction that the ball valve element of pilot valve 12 is seated before valve member 59 and seal ring 49 are parted. When thus provided only a minimum volume of fluids is vented since no fluid would then be passed across the pilot valve to maintain the pressure in passage 11a of control valve 11. In order to enhance the preferred sequence of pilot valve and bleed valve operations it may be desirable to spring-load the ball valve element of the pilot valve.

The catch means for retaining piston 21 in a spring biased position is provided axially adjacent chamber portion 31b of the housing. As shown in FIGS. 1 and 2, the housing is formed with radial apertures 64 for retaining the detent ball members 24; and rod 36 is provided with an annular groove 65 that is positioned in radial alignment with said apertures when said rod is moved by the spring biasing means 23. The catch means also includes a catch sleeve 66 that is telescoped over the upper end of the housing (including radial apertures 64) and is acted upon by a helical spring 67.

Sleeve 66 is provided with an inner annular groove 68 which is adapted for receiving a portion of detent ball members 24. It will be evident that the detent ball members are thereby captivated in their apertures while limiting the axial movement of sleeve 66. Since the groove 68 is formed with an inclined shoulder 69 which may engage each ball member with a moving force exerted by spring 67, the ball members are urged inwardly toward rod 36 when the various parts assume the relationship of FIG. 1. If rod 36 is then positioned with its groove 65 aligned with apertures 64, the ball members will be moved into said groove by the cooperative action of inclined shoulder 69 and spring 67. But as the ball members enter groove 65, as shown in FIG. 2, the catch sleeve 66 moves upwardly until the lip of shoulder 69 is positioned beyond a point of tangency with each ball member. This places an axial land 70 into abutment with ball members 24, causing them to be virtually locked in place.

It will be understood that the latch means may be selectively released by operating sleeve 66 downwardly against spring 67, thereby causing land 70 to be retracted. If sufficient pressure is then applied into chamber 20, causing piston 21 and rod 36 to be moved downwardly, the inclined surface 71 of groove 65 will cam the detent ball members laterally into the more recessed portion of groove 68.

The operation of the above described pressure controlled device is generally as follows: assuming that valve 14 is positioned for connecting a pressure line 31 to chamber 20 (as shown in FIG. 1) piston 21 will place valve element 59 against seal ring 49, compressing springs 23 and 51 and moving valve operating member 22 against the ball valve element of pilot valve 12. Although port 44 is open to the fluid pressure within pilot valve 12 and passage 11a, no fluid can escape through axial passage 43 since the valve element 59 is seated against seal ring 49. The transmittal of pressure through pilot valve 12 into passage 11a of safety control valve 11 produces a condition within said valve 11 for maintaining the valve open. This, then, is the normal operating position for the pressure controlled device.

Now, should valve 14 be operated to its alternate position (FIG. 2), allowing the pressure within chamber 20 to be bled while closing off pressure line 13, pilot valve 12 will be responsively closed. The reduction of fluid pressure in chamber 20 allows biasing spring 23 to urge the piston 21 upwardly, carrying with it valve member 59. Spring 51 will, therefore, carry member 22 upward until shoulder 58 engages shoulder 56, thereby limiting the movement of member 22 and causing the valve member 59 and seal ring 49 to be separated. As this valve member and seal ring become separated the gas pressure within passage 11a is bled off through port 44, passage 43, opening 60, and port 62, thus causing a differential pressure to occur across pilot valve 12. By virtue of the inherent characteristics of valve 11, this differential pressure will effectuate a closure of said valve.

It will also be noted that as piston 21 is moved by spring 23 into the position illustrated in FIG. 2, groove 65 of rod 36 is moved into alignment with apertures 64. Spring 67, which urges sleeve 66 upwardly, causes the detent ball members 24 to be cammed into the groove 65. As land 70 is then positioned into contact with the ball members, they cannot be moved from groove 65 until sleeve 66 is moved downwardly.

In view of the above described manner of operation it will be understood that once the pressure within chamber 20 has been relieved and the catch means actuated, neither rod 36 nor the other piston actuated elements 59 and 22 can be operated until sleeve 66 is moved downward releasing the detent ball members. However, as soon as sleeve 66 is so operated (and providing the fluid pressure is reapplied into chamber 20) piston 21 will move rod 36 downwardly, causing ball members 24 to be cammed laterally outward into the more recessed portion of groove 68.

In the foregoing description, relating particularly to the structure of FIGS. 1 and 2, it would be necessary to manually or mechanically actuate sleeve 66 in order to release the catch means. A second embodiment of the device as illustrated in FIGS. 3 and 4 is equipped with a pressure-operated reset structure. The structure shown may also be operated manually if desired.

In this second embodiment sleeve 66 of FIGS. 1 and 2 has been supplanted by a piston sleeve member 72 having a rod extension 73. Member 72 is enclosed by a cylinder housing 74 and defines a pressure chamber 75 therebetween. Chamber 75 is pressure sealed by an O-ring seal 76 between rod 73 and housing 74 and an O-ring 77 between piston sleeve 72 and said housing. Back-up ring 78 is also employed to prevent extrusion of O-ring 77. The housing 74 may be secured to the chamber portion 31b of the previously described pressure responsive housing by screws 79, tapped holes being provided in said chamber portion for this purpose.

FIG. 3 shows the various parts of the catch means as they would be positioned under normal operating conditions. Pressure chamber 75 would then be connected to atmosphere through a conventional three-way valve 80. When the pressure responsive actuator mechanism within chamber 20 is moved upwardly, as described in connection with FIGS. 1 and 2, detent ball members 24 engage groove 65 of rod 36, thus releasing piston sleeve 72 and permitting it to be urged into its upper position by spring 67. In this condition rod 36 and related mechanism will be locked.

When it is desired to reset the actuator device, and after chamber 20 has been repressurized, valve 80 is operated to connect chamber 75 to a pressure line 81, as shown by FIG. 4. The fluid pressure from line 81 will force piston sleeve 72 downward, releasing the detent ball members 24 and allowing rod 36 to be moved by piston 21. After the catch means has been released, chamber 75 is again vented to atmosphere by operating valve 80 to the position of FIG. 3.

It will be further noted that this last described reset structure can also be manually operated if desired. Therefore, in the event of pressure failure in line 81, the apparatus will not be completely immobilized but may be manually reset by depressing rod 73, thereby repositioning piston sleeve 72.

It is to be understood that the forms of the invention herewith shown and described are to be taken as preferred examples thereof, and that various changes may be made in the shape, size and arrangement of parts without departing from the spirit of the invention or the scope of the attached claims, and each of such changes is contemplated.

Having thus described my invention, what I claim and desire to secure by Letters Patent is:

1. A pressure controlled pilot valve operator comprising an expansible chamber device having a housing with a movable wall member, a valve operating member adapted to be moved by said wall member, a catch rod mounted to and movable with said wall member, means biasing said movable wall member in one direction, a connection for transmitting fluid operating pressure into said housing and moving said wall member against said biasing means, said housing having a sleeve portion with a cylindrical bore for receiving said rod and a radially extending slot for receiving a detent member, said rod having a recess adapted to be positioned in radial alignment with said slot when said rod is moved by said biasing means, said recess having an inclined camming surface adapted for engaging and moving a detent radially outward therefrom, a detent member positioned in said slot, a detent operating means including an axially movable sleeve member having an internal recess for partly receiving and confining said detent, said internal recess having an inclined camming surface and an axially parallel locking surface adapted for engaging said detent, and including a spring biasing means urging said sleeve axially of said rod, causing said detent to be moved radially inward toward said rod and held in a locked position whenever said rod recess is radially aligned with said slot.

2. A pressure controlled pilot valve operator comprising an expansible chamber device having a housing with a movable wall member, a valve operating member adapted to be moved by said wall member, a catch rod mounted to and movable with said wall member, means biasing said movable wall member in one direction, a connection for transmitting fluid operating pressure into said housing and moving said wall member against said biasing means, said housing having a sleeve portion with a cylindrical bore for receiving said rod and a radially extending slot for receiving a detent member, said rod having a recess adapted to be positioned in radial alignment with said slot when said rod is moved by said biasing means, said recess having an inclined camming surface adapted for engaging and moving a detent radially outward therefrom, a detent member positioned in said slot, a detent operating means including an axially movable sleeve member having an internal recess for partly receiving and confining said detent, said internal recess having an inclined camming surface and an axially parallel locking surface adapted for engaging said detent, a spring biasing means urging said sleeve axially of said rod, causing said detent to be moved radially inward toward said rod and held in a locked position whenever said rod recess is radially aligned with said slot, and fluid pressure means for moving said sleeve member against said biasing means, allowing said detent to be moved radially outward from engagement with said rod.

3. A pressure controlled pilot valve operator comprising an expansible chamber device having a housing with a movable wall member, a valve operating member adapted to be moved by said wall member, a catch rod mounted to and movable with said wall member, means biasing said movable wall member in one direction, a connection for transmitting fluid operating pressure into said housing and moving said wall member against said biasing means, said housing having a sleeve portion with a cylindrical bore for receiving said rod and a radially extending slot for receiving a detent member, said rod having a recess adapted to be positioned in radial alignment with said slot when said rod is moved by said biasing means, said recess having an inclined camming surface adapted for engaging and moving a detent radially outward therefrom, a detent member positioned in said slot, a detent operating means including an axially movable sleeve member having an internal recess for partly receiving and confining said detent, said internal recess having an inclined camming surface and an axially parallel locking surface adapted for engaging said detent, a spring biasing means urging said sleeve axially of said rod, causing said detent to be moved radially inward toward said rod and held in a locked position whenever said rod recess is radially aligned with said slot, and means for enclosing said movable sleeve member within a pressure chamber, said sleeve member acting as a piston therein, whereby the application of fluid pressure into said pressure chamber will cause said sleeve to be moved against said spring biasing means and unlock said detent, allowing said detent to be moved radially outward from engagement with said rod.

4. A pressure controlled pilot valve operator comprising an expansible chamber device having a movable wall member and an actuating member connected thereto, means biasing said movable wall member into a first position, a connection for transmitting fluid operating pressure into said device and moving said wall member against said biasing means into a second position, a valve operator reciprocally mounted in the path of said actuating member, means urging said valve operator toward said actuating member, means limiting the degree of reciprocal travel of said valve operator, a catch rod mounted to said movable wall member and reciprocally movable therewith, said device including a sleeve portion having a cylindrical bore for receiving said rod and a radially extending slot for receiving a detent member, said rod having a radial recess adapted to be positioned in radial alignment with said slot when said rod is moved by said biasing means, said recess having an inclined camming surface adapted for engaging and moving a detent radially outward therefrom, a detent member positioned in said slot, a detent operating means including an axially movable sleeve member having an internal recess for partly receiving and confining said detent, said internal recess having an inclined camming surface and an axially parallel locking surface adapted for engaging and moving said detent radially inward toward said rod, and including means urging said sleeve axially of said rod, causing said detent to be moved radially inward toward said rod whenever said rod recess is radially aligned with said slot.

5. A pressure controlled pilot valve operator comprising an expansible chamber device having a movable wall member movable between first and second positions, a valve operating member adapted to be moved by said wall member, means biasing said wall member to said first position, a connection for transmitting fluid under pressure into said device and holding said wall member against the bias of said biasing means in said second position, a catch member movable with said wall member, detent means biased towards and movable into engagement with said catch member upon movement of said wall member from its second to its first position, and lock means automatically operable to lock said detent means into engagement with said catch member upon movement of said detent means into engagement with said catch means to positively restrain movement of said wall member from its first to its second position by said fluid under pressure.

6. A device as set forth in claim 5 and further including manually operable means for releasing said lock means to permit movement of said detent means from engagement with said catch member to allow movement of said wall member from its first to its second position.

7. A device as set forth in claim 5 and further including fluid pressure operated means for releasing said lock means to permit removal of said detent means from engagement with said catch member to allow movement of said wall member from its first to its second position.

References Cited in the file of this patent

UNITED STATES PATENTS

| | | |
|---|---|---|
| 851,277 | Clark | Apr. 23, 1907 |
| 1,000,799 | Grimes | Aug. 15, 1911 |
| 1,144,758 | Desmond | June 29, 1915 |
| 2,665,711 | Parks | Jan. 12, 1954 |
| 2,675,204 | Johnson | Apr. 13, 1954 |
| 2,712,829 | Whitaker | July 12, 1955 |
| 2,731,034 | Dinkelkamp | Jan. 17, 1956 |
| 2,933,101 | Rockwell | Apr. 19, 1960 |
| 3,008,454 | Wilkins | Nov. 14, 1961 |
| 3,040,772 | Todd | June 26, 1962 |